US006568642B1

(12) United States Patent
Kirschner

(10) Patent No.: US 6,568,642 B1
(45) Date of Patent: May 27, 2003

(54) ANGLE BRACKET

(75) Inventor: Kraig A. Kirschner, Corona, CA (US)

(73) Assignee: Automatic Fire Control, Incorporated, South El Monte, CA (US)

( * ) Notice: Subject to any disclaimer, the term of this patent is extended or adjusted under 35 U.S.C. 154(b) by 0 days.

(21) Appl. No.: 09/595,413

(22) Filed: Jun. 16, 2000

(51) Int. Cl.$^7$ .................................................. E16L 3/08
(52) U.S. Cl. ......................... 248/65; 248/67; 248/220.1
(58) Field of Search ........................... 248/200, 49, 59, 248/62, 65, 67, 70, 72, 210

(56) References Cited

U.S. PATENT DOCUMENTS

| | | | | |
|---|---|---|---|---|
| 2,274,217 A | * | 2/1942 | Sauer | 248/200 |
| 3,162,412 A | * | 12/1964 | McEntire | 248/56 |
| 3,863,679 A | * | 2/1975 | Young | 248/54 R |
| 4,079,281 A | * | 3/1978 | Nakayama et al. | 285/64 |
| 4,447,961 A | * | 5/1984 | Valat | 33/600 |
| 4,645,150 A | * | 2/1987 | Taylor | 248/56 |
| 5,110,073 A | * | 5/1992 | Schoenky | 248/49 |
| 5,603,473 A | * | 2/1997 | Shotey | 248/49 |
| 5,702,077 A | * | 12/1997 | Heath | 248/59 |
| 5,730,522 A | * | 3/1998 | Wyke et al. | 248/200 |
| 5,788,198 A | * | 8/1998 | Sharpe | 248/210 |

OTHER PUBLICATIONS

Drawing of AFCON—undated.

* cited by examiner

Primary Examiner—Ramon O. Ramirez
Assistant Examiner—Tan Le

(57) ABSTRACT

An angle bracket including a mounting plate and having an attachment flange extending from the mounting plate at substantially 90° from one end thereof. The mounting plate includes a central mounting hole and six peripheral mounting holes symmetrically disposed about the central mounting hole. The attachment flange includes a threaded attachment hole therethrough. Two of the six peripheral mounting holes, the central mounting hole and the attachment hole are aligned.

5 Claims, 1 Drawing Sheet

ANGLE BRACKET

BACKGROUND OF THE INVENTION

The field of the present invention is mounting hardware for structures.

Building structures frequently require the mounting of conduit, pipe, and miscellaneous architectural, decorative and mechanical devices thereto. To do so, a wide variety of brackets and other hardware have been developed. Such hardware is frequently, if not universally, the subject of building code requirements, UL specifications and the like. Angle brackets for the hanging of electrical conduit and piping are listed under UL standards, not only for the brackets themselves, but also for the fasteners employed. Of particular applicability is the National Fire Protection Association's Code 13: Installation of Sprinkler Systems (NFPA #13). These requirements have largely been met by a great variety of devices to address various mounting conditions and requirements.

SUMMARY OF THE INVENTION

The present invention is directed to an angle bracket providing substantial flexibility in accommodating mounting requirements. A mounting plate includes a central mounting hole and six peripheral mounting holes symmetrically disposed about the central mounting hole. An attachment flange extending at substantially 90° from the mounting plate includes a conventional attachment hole. The hole may be threaded. Two of the six peripheral mounting holes are aligned with the central mounting hole and the attachment hole. In this way, UL and other building code requirements can be met with mountings attached top and bottom, horizontally or in a triangular pattern as well as by the conventional center attachment. A variety of standard bolting patterns can thus be accommodated. Further, multiple fasteners aligned with the grain in a timber beam can be avoided.

Accordingly, it is an object of the present invention to provide a versatile mounting bracket. Other and further objects and advantages will appear hereinafter.

DETAILED DESCRIPTION OF THE PREFERRED EMBODIMENT

Figure 1:
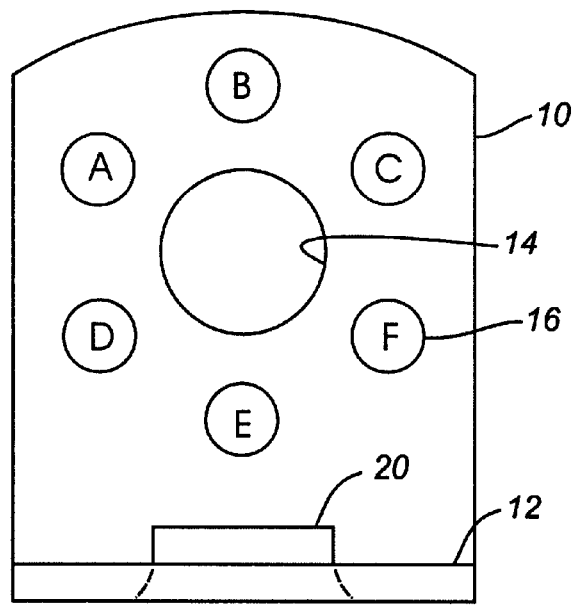
FIG. 1 is a front view of an angle bracket.
Figure 2:
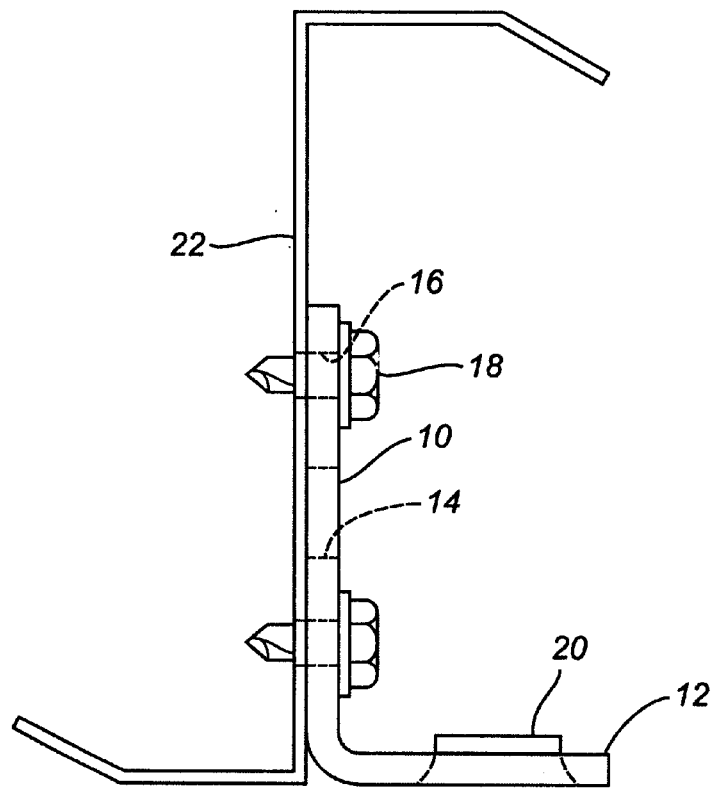
FIG. 2 is a side view of the angle bracket of FIG. 1 mounted to a formed metal beam.

Turning in detail to the figures, an angle bracket is illustrated as including a mounting plate 10 and an attachment flange 12 extending at substantially 90° thereto. The bracket is preferably made of a single plate of carbon steel which may be unfinished or electro-galvanized. Other coatings may be applied as desired. The plate may also be of stainless steel for harsh environments.

The mounting plate 10 includes a central mounting hole 14 which is conventional to such brackets. The central mounting hole 14 accommodates ⅜ inch and ½ inch fasteners. About the central mounting hole 14, six peripheral mounting holes 16 are symmetrically disposed. The symmetric disposition may be about an axis aligned with a plane containing the center axis of the central mounting hole 14 and the center axes of the peripheral mounting holes 16 located above and below the central mounting hole 14. Additionally, the symmetry might be achieved by positioning the six peripheral mounting holes 16 equiangularly about and radially equally from the central mounting hole 14. The six peripheral mounting holes 16 typically are sized to receive quarter inch or #14 Tek type screws 18.

The attachment flange 12 conventionally extends at substantially 90° to the plane of the mounting plate 10. A conventional radiused attachment hole 20 is centrally punched therethrough and threaded. This hole is designed to receive a ⅜ inch threaded rod. The central axis of the attachment hole 20 is aligned with the plane defined by the central axes of the central mounting hole 14 and the peripheral mounting hole 16 located above and below the central mounting hole 14.

To illustrate the possible combinations of attachment patterns, each of the six peripheral mounting holes 16 have been identified in FIG. 1 with a letter designation A through F. The UL listed fasteners per NFPA #13 may be employed in the following bolt patterns:

1 unit @B or E 2 units @B&E or A&C 3 units @A&C&E or B&D&F

The following applications meet the UL listed fasteners tested per NFPA #13.

| | WOOD No Pre Drill | |
| --- | --- | --- |
| Fastener Type | Qty. Fastener | Max Pipe Size |
| ¼ × 2 Lag Bolt | 1 | 2½ |
| ¼ × 2 Lag Bolt | 2 | 4 |
| #16 × 2 Drive Screw | 2 | 2 |
| #16 × 2 Drive Screw | 3 | 4 |

| | STEEL Using ¼" or #14 Tek Type Screw | |
| --- | --- | --- |
| Minimum Thickness | Qty. Fasteners | Max Pipe Size |
| 14 GA. | 1 | 3 |
| | 2 | 4 |
| 16 GA. | 1 | 2 |
| | 2 | 3 |
| | 4 | 4 |
| 18 GA. | 2 | 2½ |
| | 3 | 4 |
| 20 GA. | 3 | 3 |
| 22 GA. | 3 | 2 |
| | 4 | 3 |

In use, the class of such angle brackets is typically referred to as threaded side beam connectors. The mounting plate 10 is mounted vertically to a formed metal or wood beam 22. The attachment flange 12 extends horizontally and receives a threaded rod. The rod extends downwardly from the attachment flange 12 to receive a bolt with associated strapping or the like to retain a pipe extending horizontally in a traditional manner.

Thus, an improved angle bracket of substantial versatility is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An angel bracket comprising
a mounting plate including a central mounting hole and six peripheral mounting holes disposed about the central mounting hole;
an attachment flange extending from the mounting plate at substantially 90° and including an attachment hole therethrough, the axes of two of the peripheral mounting holes and the central mounting hole lying in a common plane with the axis of the attachment hole.

2. The angle bracket of claim 1, the six peripheral mounting holes being disposed symmetrically to either side of a plane including the central axes of the central mounting hole and the attachment hole.

3. The angle bracket of claim 2, the six peripheral mounting holes being equiangularly spaced about the central mounting hole and radially equidistant from the center of the central mounting hole.

4. The angle bracket of claim 1, the attachment hole being threaded.

5. An angle bracket comprising a mounting plate including a central mounting hole and six peripheral mounting holes disposed about the central mounting hole with the central mounting hole being centrally located of the six mounting holes;

an attachment flange extending from the mounting plate at substantially 90° and including an attachment hole therethrough the axes of two of the peripheral mounting holes and the central mounting hole lying in a common plane with the axis of the attachment hole.

* * * * *